US010036324B2

(12) United States Patent
Scott et al.

(10) Patent No.: US 10,036,324 B2
(45) Date of Patent: *Jul. 31, 2018

(54) INSTALLATION MOUNTS FOR A TURBINE EXHAUST CASE

(71) Applicant: United Technologies Corporation, Hartford, CT (US)

(72) Inventors: Jonathan Ariel Scott, Southington, CT (US); John J. Henderson, West Hartford, CT (US); Ralph D. Harris, New Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 544 days.

This patent is subject to a terminal disclaimer.

(21) Appl. No.: 14/649,161

(22) PCT Filed: Dec. 19, 2013

(86) PCT No.: PCT/US2013/076487
§ 371 (c)(1),
(2) Date: Jun. 2, 2015

(87) PCT Pub. No.: WO2014/105617
PCT Pub. Date: Jul. 3, 2014

(65) Prior Publication Data
US 2015/0308343 A1 Oct. 29, 2015

Related U.S. Application Data

(60) Provisional application No. 61/747,257, filed on Dec. 29, 2012.

(51) Int. Cl.
F02C 7/20 (2006.01)
F01D 25/30 (2006.01)
(Continued)

(52) U.S. Cl.
CPC .............. *F02C 7/20* (2013.01); *F01D 25/162* (2013.01); *F01D 25/24* (2013.01); *F01D 25/28* (2013.01); *F01D 25/30* (2013.01)

(58) Field of Classification Search
CPC .......... F02C 7/20; F01D 25/162; F01D 25/24; F01D 25/28; F01D 25/30
(Continued)

(56) References Cited

U.S. PATENT DOCUMENTS 6,612,807 B2 * 9/2003 Czachor .................. F01D 9/065
415/116
7,100,358 B2 9/2006 Gekht et al.
(Continued)

FOREIGN PATENT DOCUMENTS

EP 0785389 A1 7/1997
WO WO2010/128896 A1 11/2010

OTHER PUBLICATIONS

Extended European Search Report for EP Application No. 13869044.1, dated Feb. 16, 2016, 9 pages.
(Continued)

Primary Examiner — Phutthiwat Wongwian
Assistant Examiner — Loren Edwards
(74) Attorney, Agent, or Firm — Kinney & Lange, P.A.

(57) ABSTRACT

A turbine exhaust case frame (100) comprises an inner ring (104), an outer ring (102), and a plurality of load-bearing struts (106). The inner ring is configured to carry a load from inner bearings. The outer ring has installation bosses (116) with downward-facing mount surfaces (120). The load-bearing struts connect the inner ring to the outer ring.

14 Claims, 3 Drawing Sheets

(51) Int. Cl.
*F01D 25/16* (2006.01)
*F01D 25/28* (2006.01)
*F01D 25/24* (2006.01)

(58) Field of Classification Search
USPC .......................................................... 60/796
See application file for complete search history.

(56) References Cited

U.S. PATENT DOCUMENTS

| | | | |
|---|---|---|---|
| 8,091,371 B2 * | 1/2012 | Durocher | F01D 9/065 |
| | | | 415/213.1 |
| 9,027,351 B2 * | 5/2015 | Baten | F01D 25/285 |
| | | | 206/319 |
| 2010/0132370 A1 | 6/2010 | Durocher et al. | |
| 2010/0303608 A1 * | 12/2010 | Kataoka | F01D 25/162 |
| | | | 415/68 |
| 2011/0016881 A1 * | 1/2011 | Ruiz | F01D 25/28 |
| | | | 60/796 |
| 2011/0030387 A1 | 2/2011 | Kumar et al. | |
| 2012/0051903 A1 | 3/2012 | Heyerman et al. | |

OTHER PUBLICATIONS

International Search Report and Written Opinion from PCT Application Serial No. PCT/US2013/076487, dated Apr. 8, 2014, 13 pages.

* cited by examiner

INSTALLATION MOUNTS FOR A TURBINE EXHAUST CASE

BACKGROUND

The present disclosure relates generally to gas turbine engines, and more particularly to installation mounts for a turbine exhaust case of an industrial gas turbine engine.

A turbine exhaust case is a structural frame that supports engine bearing loads while providing a gas path at or near the aft end of a gas turbine engine. Some aeroengines utilize a turbine exhaust case to help mount the gas turbine engine to an aircraft airframe. In industrial applications, a turbine exhaust case is more commonly used to couple gas turbine engines to a power turbine that powers an electrical generator. Industrial turbine exhaust cases can, for instance, be situated between a low pressure engine turbine and a generator power turbine. A turbine exhaust case must bear shaft loads from interior bearings, and must be capable of sustained operation at high temperatures.

Turbine exhaust cases serve two primary purposes: airflow channeling and structural support. Turbine exhaust cases typically comprise structures with inner and outer rings connected by radial struts. The struts and rings often define a core flow path from fore to aft, while simultaneously mechanically supporting shaft bearings situated axially inward of the inner ring. The components of a turbine exhaust case are exposed to very high temperatures along the core flow path. Various approaches and architectures have been employed to handle these high temperatures. Some turbine exhaust case frames utilize high-temperature, high-stress capable materials to both define the core flow path and bear mechanical loads. Other frame architectures separate these two functions, pairing a structural frame for mechanical loads with a high-temperature capable fairing to define the core flow path. In industrial applications, turbine exhaust cases are sometimes anchored to installation structures to support the gas turbine engine.

SUMMARY

The present disclosure is directed toward a turbine exhaust case frame comprising an inner ring, an outer ring, and a plurality of load-bearing struts. The inner ring is configured to carry a load from inner bearings. The outer ring has installation bosses with downward-facing mount surfaces. The load-bearing struts connect the inner ring to the outer ring.

DETAILED DESCRIPTION

Figure 1:
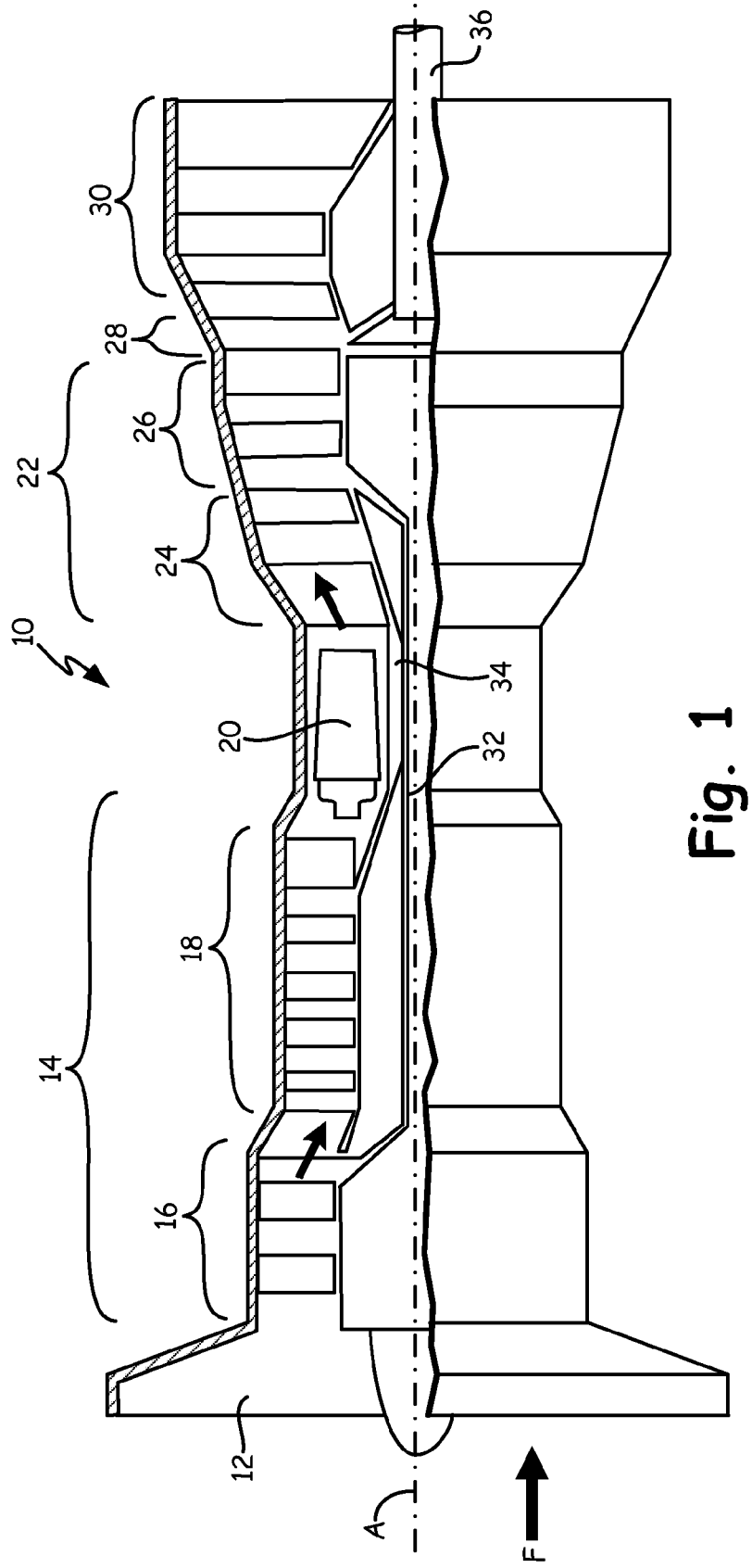
FIG. 1 is a simplified partial cross-sectional view of an embodiment of a gas turbine engine.

FIG. 1 is a simplified partial cross-sectional view of gas turbine engine 10, comprising inlet 12, compressor 14 (with low pressure compressor 16 and high pressure compressor 18), combustor 20, engine turbine 22 (with high pressure turbine 24 and low pressure turbine 26), turbine exhaust case 28, power turbine 30, low pressure shaft 32, high pressure shaft 34, and power shaft 36. Gas turbine engine 10 can, for instance, be an industrial power turbine.

Low pressure shaft 32, high pressure shaft 34, and power shaft 36 are situated along rotational axis A. In the depicted embodiment, low pressure shaft 32 and high pressure shaft 34 are arranged concentrically, while power shaft 36 is disposed axially aft of low pressure shaft 32 and high pressure shaft 34. Low pressure shaft 32 defines a low pressure spool including low pressure compressor 16 and low pressure turbine 26. High pressure shaft 34 analogously defines a high pressure spool including high pressure compressor 18 and high pressure compressor 24. As is well known in the art of gas turbines, airflow F is received at inlet 12, then pressurized by low pressure compressor 16 and high pressure compressor 18. Fuel is injected at combustor 20, where the resulting fuel-air mixture is ignited. Expanding combustion gasses rotate high pressure turbine 24 and low pressure turbine 26, thereby driving high and low pressure compressors 18 and 16 through high pressure shaft 34 and low pressure shaft 32, respectively. Although compressor 14 and engine turbine 22 are depicted as two-spool components with high and low sections on separate shafts, single spool or 3+ spool embodiments of compressor 14 and engine turbine 22 are also possible. Turbine exhaust case 28 carries airflow from low pressure turbine 26 to power turbine 30, where this airflow drives power shaft 36. Power shaft 36 can, for instance, drive an electrical generator, pump, mechanical gearbox, or other accessory (not shown).

In addition to defining an airflow path from low pressure turbine 26 to power turbine 30, turbine exhaust case 28 can support one or more shaft loads. Turbine exhaust case 28 can, for instance, support low pressure shaft 32 via bearing compartments (not shown) disposed to communicate load from low pressure shaft 32 to a structural frame of turbine exhaust case 28.

Figure 2:
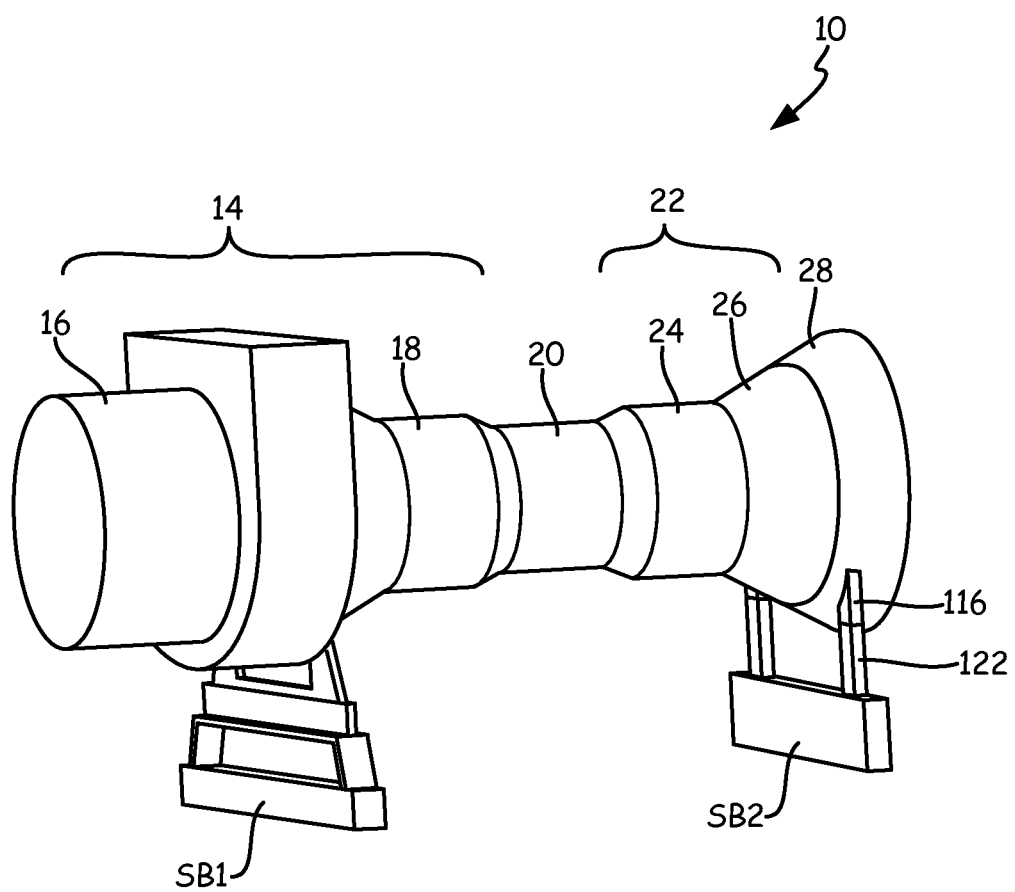
FIG. 2 is a perspective view of a gas generator of the gas turbine engine of FIG. 1.

FIG. 2 is a cross-sectional view of one embodiment of gas generator a of gas turbine engine 10, comprising compressor 14 (with low pressure compressor 16 and high pressure compressor 18), combustor 20, engine turbine 22 (with high pressure turbine 24 and low pressure turbine 26), turbine exhaust case 28 (with installation mounts 116), support bracket SB1, and support bracket SB2 (with support post 122). FIG. 2 depicts an installation setup of gas turbine engine 10 wherein compressor 14, combustor 20, engine turbine 22, and turbine exhaust case 28 are supported in two locations. Support bracket SB1 supports gas turbine engine 10 at low pressure compressor 16, near high pressure turbine 18. Support bracket SB2 supports gas turbine engine 10 at turbine exhaust case 28, and interfaces with installation mounts 116.

In the depicted embodiment, gas turbine engine 10 is suspended between support brackets SB1 and SB2, which together carry the full weight of compressor 14, combustor 20, engine turbine 22, and turbine exhaust case 28. As shown in FIG. 1, power turbine 30 attaches aft of turbine exhaust case 28. In the embodiment depicted in FIG. 2, power turbine 30 and associated generator hardware are installed and supported separately from compressor 14, combustor 20, engine turbine 22, and turbine exhaust case 28. In alternative embodiments, support bracket SB1 can be anchored elsewhere on compressor 14, or on inlet 12. Some embodiments of gas turbine engine 10 can be supported by three or more support brackets, e.g. with two support brackets supporting compressor 14, and a third supporting turbine exhaust case 28 (as shown). Furthermore, generator components such as power turbine 30 can, in some embodiments, be anchored to and supported in part by turbine exhaust case 28.

Turbine exhaust case 28 serves as one of a limited number of attachment points by which the entirety of gas turbine engine 10 is balanced and supported. Turbine exhaust case 28 carries load from low pressure shaft 32 to support bracket SB2. In particular, turbine exhaust case 28 interfaces with mounting posts 122 of support bracket SB2 via installation mounts 116. As described in greater detail below with respect to FIG. 3, installation mounts 116 are substantially triangular flanges with flat, downward-facing horizontal surfaces (with reference to the orientation of FIG. 2) that face towards mounting posts 122. Mounting posts 122 provide a flat load platform for installation mounts 116, as well as attachment points for securing fasteners.

Figure 3:
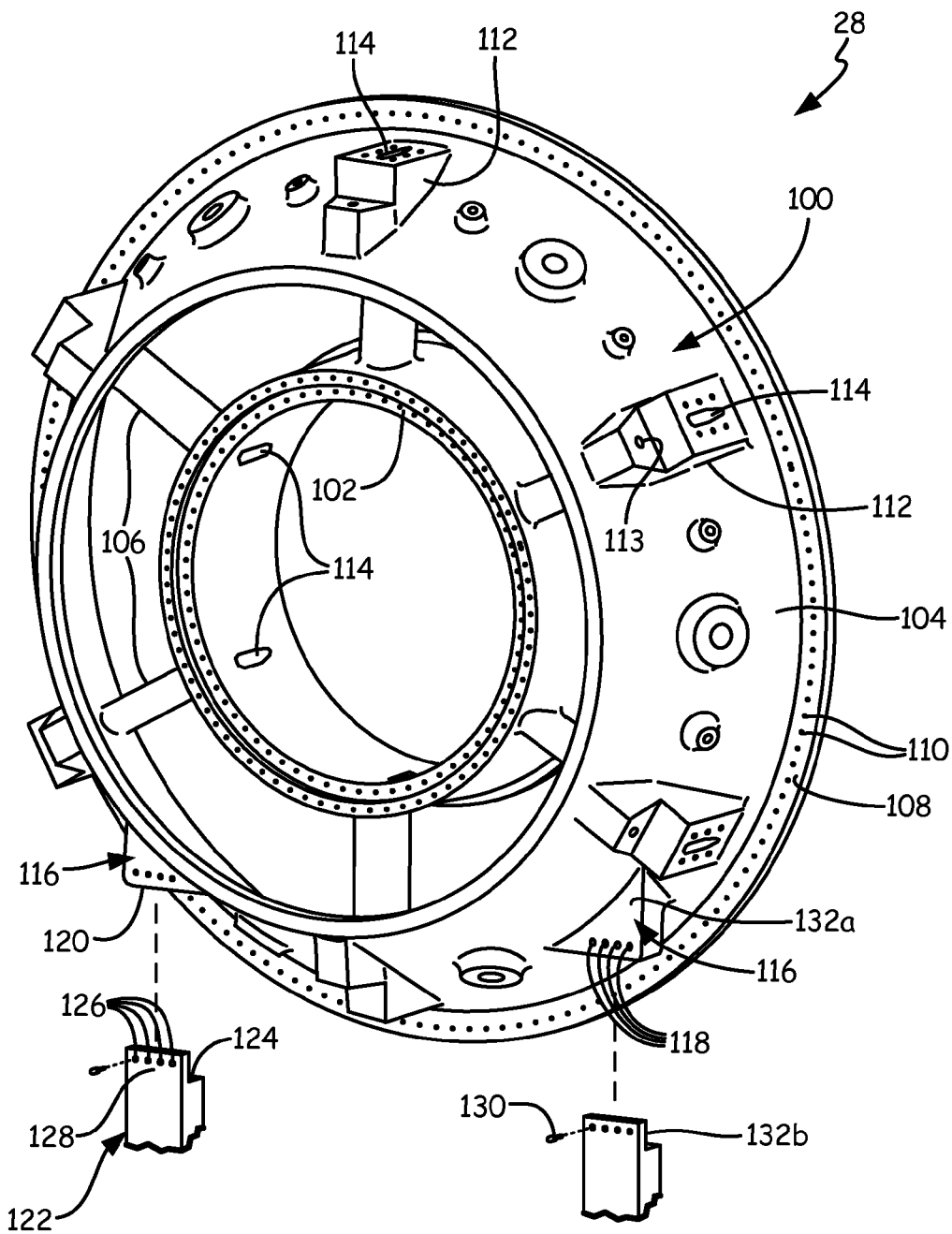
FIG. 3 is a perspective view of a turbine exhaust frame of the gas generator of FIG. 2.

FIG. 3 is a perspective view of frame 100 of turbine exhaust case 28. Frame 100 comprises inner ring 102, outer ring 104, struts 106, power turbine connection flange 108, (with power turbine connection holes 110), multi-purpose bosses 112 (with service line apertures 114 extending through struts 106 to inner ring 102), installation mounts 116 (with mounting holes 118, load surface 120, and retention surface 132a). FIG. 3 also depicts support posts 122 of support bracket SB2. Support posts 122 comprise retaining flange 128 (with mounting holes 126 and retention surface 132b) and load surface 124. Fasteners 130 (shown exploded) cooperate with mounting holes 118 and 126 to anchor installation mounts 116 to mounting posts 122. Fasteners 130 can, for instance, be bolts, screws, rivets, or pins. Mounting holes 118 and 126 are corresponding apertures for fasteners 130.

Frame 100 is a rigid load-bearing structure formed, for instance, of cast steel. Outer ring 104 provides a plurality of external attachment points to adjacent turbine sections (e.g. low pressure turbine 26, power turbine 30), supports (e.g. mounting posts 122 via installation mounts 116), and secondary components (e.g. service lines via service line apertures 114 on multi-purpose bosses 112). Inner ring 102 is a cylindrical load ring connected to outer ring 104 via a plurality of struts 106, which communicate radial bearing loads to outer ring 102.

Power turbine connection flange 108 has a plurality of power turbine connection holes 110 allowing power turbine connection flange 108 to be affixed to power turbine 30. Frame 100 also features a plurality of multi-function bosses 112 (six, in the depicted embodiment) distributed circumferentially about outer ring 104. Each multi-purpose boss 112 includes a plurality of apertures including attachment points 113 and service line apertures 114. Attachment points 113 allow turbine exhaust case 28 to be mounted or secured for transit (e.g. for shipping or during installation processes) and/or for permanent installation. Service line apertures 114 can, for example, carry cooling air and lubricating oil lines.

Outer ring 104 has two substantially triangular-shaped installation mounts 116, as noted previously with respect to FIG. 2. Installation mounts 116 provide attachment points for mounting posts 122. In the depicted embodiment, load surfaces 120 of installation mounts 116 are substantially flat horizontal surfaces facing downward with reference to the orientation of FIG. 3. In the illustrated embodiment, all load surfaces 120 are coplanar, and all load surfaces 124 are coplanar. In alternative embodiments, load surfaces 120 can, for instance, be contoured, curved, or angled surfaces mirrored by load surfaces 124 of support posts 122 (which face upward with respect to the orientation of FIG. 3). Load surfaces 120 match and/or mate with load surfaces 124 of support posts 122, such that the resulting load vectors between frame 100 and mounting posts 122 are substantially vertical. Retaining flanges 128 have retention surfaces 132b that mate with retention surfaces 132a of installation mount 116 to position turbine exhaust case 28 axially with respect to mounting posts 122, along a single common axial plane. Retaining flanges 128 also house mounting holes 118.

During installation, frame 100 is lowered onto mounting posts 122 such that downward-facing load surfaces 120 of outer ring 104 rest atop upward-facing load surface 124 of support posts 122, and mounting holes 118 align with mounting holes 126. Fasteners 130 are inserted or threaded through mounting holes 118 and 126 to secure frame 100 to support bracket SB2. In some embodiments, multipurpose bosses 112 can also be used to anchor frame 110 during installation.

Discussion of Possible Embodiments

The following are non-exclusive descriptions of possible embodiments of the present invention.

A turbine exhaust case frame comprising an inner ring, an outer ring, and a plurality of load-bearing struts connecting the inner ring to the outer ring. The inner ring is configured to carry load from inner bearings. The outer ring has installation mounts with downward-facing mount surfaces.

The turbine exhaust case of the preceding paragraph can optionally include, additionally and/or alternatively, any one or more of the following features, configurations, and/or additional components:

wherein the downward-facing mount surfaces are flat, horizontal surfaces.

wherein the installation mounts are substantially triangular supports extending from the outer ring.

wherein the installation mounts have a plurality of fastener holes for attaching the installation mounts to an support post.

wherein the turbine exhaust case frame is formed of cast steel.

further comprising multipurpose bosses with service line apertures.

wherein there are two installation mounts.

An industrial gas turbine comprising a gas generator, a power turbine, and a turbine exhaust case. The gas generator has a compressor, a combustor, and an engine turbine in flow series. The power turbine is configured to drive an electrical generator, pump, or mechanical gearbox. The turbine exhaust case connects the power turbine to the drive turbine, and has installation mounts with flat horizontal mount surfaces to support the gas generator.

The industrial gas turbine of the preceding paragraph can optionally include, additionally and/or alternatively, any one or more of the following features, configurations, and/or additional components:

wherein the compressor comprises a low pressure compressor and a high pressure compressor in flow series, and wherein the drive turbine comprises a high pressure turbine that drives the high pressure compressor, and a low pressure turbine that drives the low pressure compressor, in flow series.

wherein the turbine exhaust case comprises an inner ring, an outer ring disposed concentrically within the outer ring, and a plurality of circumferentially distributed struts extending radially from the inner ring to the outer ring to carry bearing load from the inner ring to the outer ring and the installation mounts.

wherein the outer ring includes a plurality of multi-function bosses with service line apertures.

wherein the outer ring includes a power turbine connection flange with power turbine connection holes for affixing the power turbine exhaust case to the power turbine.

A gas turbine mount system comprising a turbine exhaust case, a plurality of installation mounts, a support bracket, and a plurality of fasteners. The turbine exhaust frame comprises an inner ring, an outer ring concentrically disposed outward of the inner ring, and a plurality of radial struts extending from the inner ring to the outer ring. The plurality of installation mounts are mounts disposed on the outer ring, and have first mounting holes and downward-facing mount surfaces to support the gas generator. The support bracket has support posts having second mounting holes and upward-facing mount surfaces configured to match or mate with the downward-facing mount surfaces; and The gas turbine mount system of the preceding paragraph can optionally include, additionally and/or alternatively, any one or more of the following features, configurations, and/or additional components:

wherein the downward-facing mount surfaces and the upward-facing mount surfaces are substantially flat horizontal surfaces.

wherein there are two support brackets.

wherein the installation support bracket and the installation mounts have retention surfaces in substantially a common axial plane that mate to axially retain the turbine exhaust case relative to the support bracket.

While the invention has been described with reference to an exemplary embodiment(s), it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine exhaust case frame comprising:
   an inner ring configured to carry load from inner bearings;
   an outer ring with a plurality of integrally formed installation mounts, each having coplanar mount surfaces oriented on a common plane parallel to an axis of the inner and outer rings and retention surfaces that are perpendicular to the mount surfaces, wherein the retention surfaces are configured to receive a fastener; and
   a plurality of load-bearing struts connecting the inner ring to the outer ring.

2. The turbine exhaust case frame of claim 1, wherein the installation mounts are substantially triangular supports extending from the outer ring.

3. The turbine exhaust case of claim 2, wherein there are two installation mounts with coplanar mount surfaces.

4. The turbine exhaust case frame of claim 1, wherein the installation mounts have a plurality of fastener holes for attaching the installation mounts to a support post.

5. The turbine exhaust case frame of claim 1, wherein the turbine exhaust case frame is formed of steel.

6. The turbine exhaust case frame of claim 1, further comprising multipurpose bosses with service line apertures.

7. An industrial gas turbine comprising:
   a gas generator with a compressor, a combustor, and an engine turbine in flow series;
   a power turbine configured to drive an electrical generator, pump, or mechanical gearbox; and
   a turbine exhaust case connecting the power turbine to the engine turbine, the turbine exhaust case having a plurality of integrally formed installation mounts, each with flat coplanar mount surfaces oriented on a common plane and configured to engage with coplanar surfaces of mounting posts external to the gas generator to support the weight of the gas generator.

8. The industrial gas turbine of claim 7, wherein the compressor comprises a low pressure compressor and a high pressure compressor in flow series, and wherein the engine turbine comprises a high pressure turbine that drives the high pressure compressor, and a low pressure turbine that drives the low pressure compressor, in flow series.

9. The industrial gas turbine of claim 7, wherein the turbine exhaust case comprises an inner ring, an outer ring disposed concentrically within the outer ring, and a plurality of circumferentially distributed struts extending radially from the inner ring to the outer ring to carry bearing load from the inner ring to the outer ring and the installation mounts.

10. The industrial gas turbine of claim 9, wherein the outer ring includes a plurality of multi-function bosses with service line apertures.

11. The industrial gas turbine of claim 9, wherein the outer ring includes a power turbine connection flange with power turbine connection holes for affixing the power turbine exhaust case to the power turbine.

12. A gas turbine mounting system comprising:
   a turbine exhaust case comprising an inner ring, an outer ring concentrically disposed outward of the inner ring, and a plurality of radial struts extending from the inner ring to the outer ring;
   a plurality of installation mounts disposed on the outer ring, each having retention surfaces with first mounting holes and coplanar downward-facing mount surfaces oriented on a common plane and configured to support the gas turbine, wherein the retention surfaces are perpendicular to the mount surfaces;
   a support bracket with support posts having second retention surfaces with second mounting holes and upward-facing mount surfaces having a flat geometry configured to match and mate with the coplanar downward-facing mount surfaces, wherein the second retention surfaces are perpendicular to the upward-facing mount surfaces; and
   a plurality of fasteners configured to cooperate with the first and second mounting holes to secure the downward-facing mount surfaces atop the upward-facing mount surfaces.

13. The gas turbine mounting system of claim 12, wherein there are two support brackets.

14. The gas turbine mounting system of claim 12, wherein the installation support bracket and the installation mounts have retention surfaces in substantially a common axial plane that mate to axially retain the turbine exhaust case relative to the support bracket.

* * * * *